July 28, 1936.  R. F. JONES  2,048,701
FISH CUTTING MACHINE
Filed Nov. 5, 1934  3 Sheets-Sheet 1
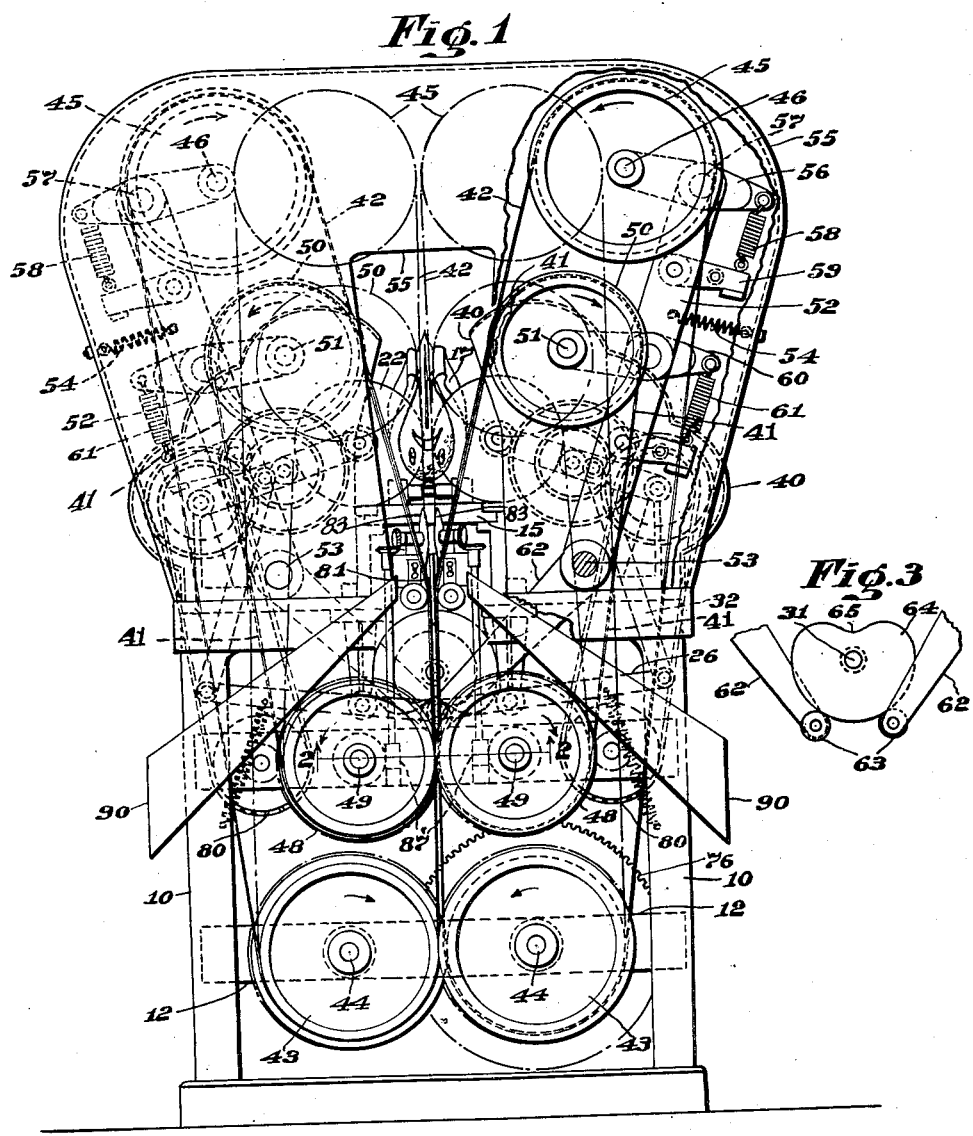
Fig.1
Fig.3
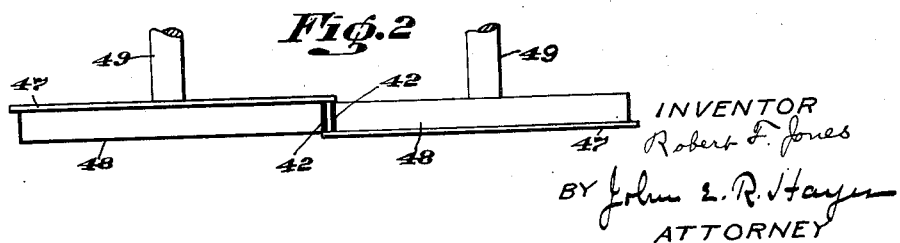
Fig.2
INVENTOR
Robert F. Jones
BY John E. R. Hayes
ATTORNEY

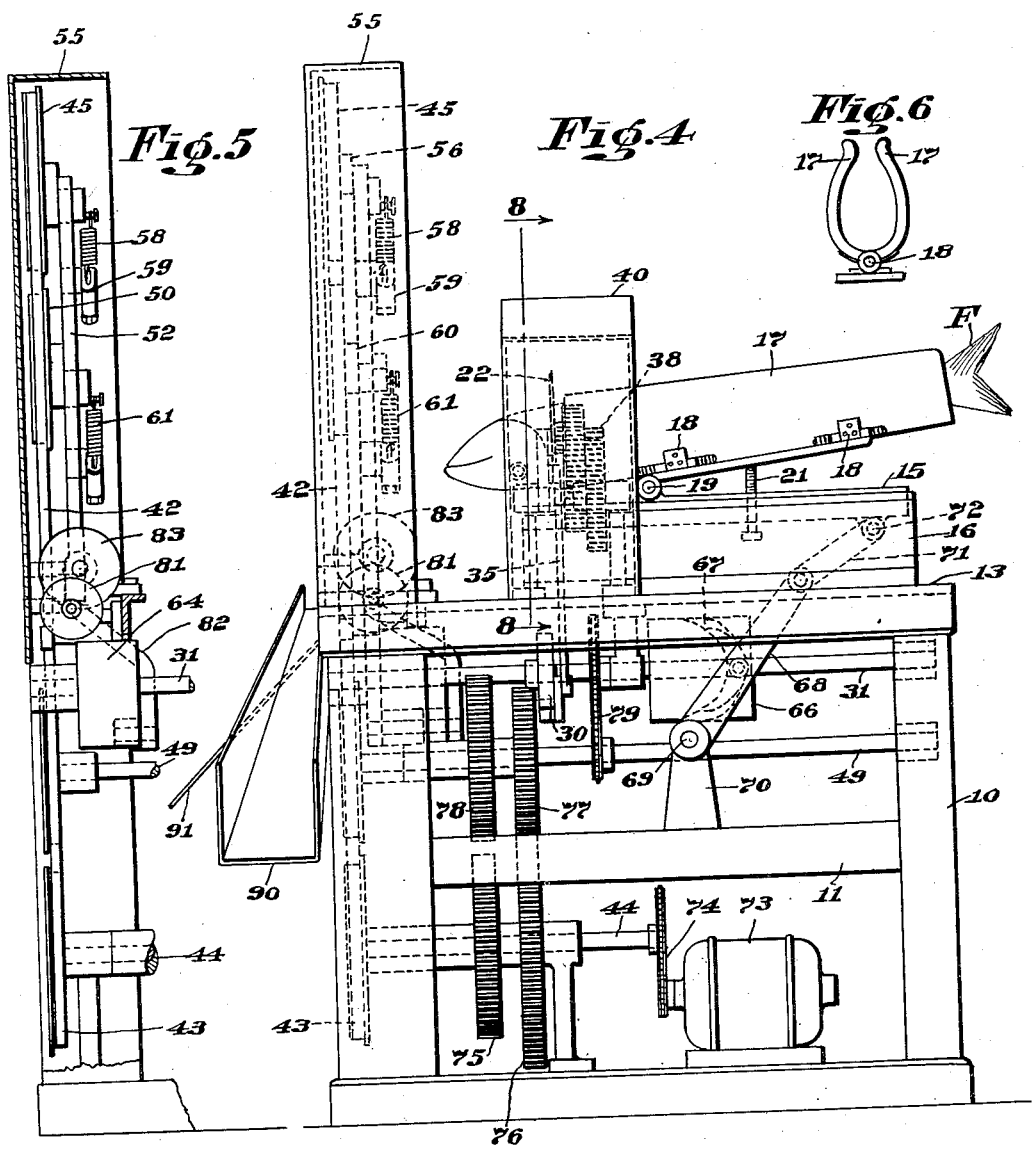

July 28, 1936.  R. F. JONES  2,048,701
FISH CUTTING MACHINE
Filed Nov. 5, 1934  3 Sheets-Sheet 3
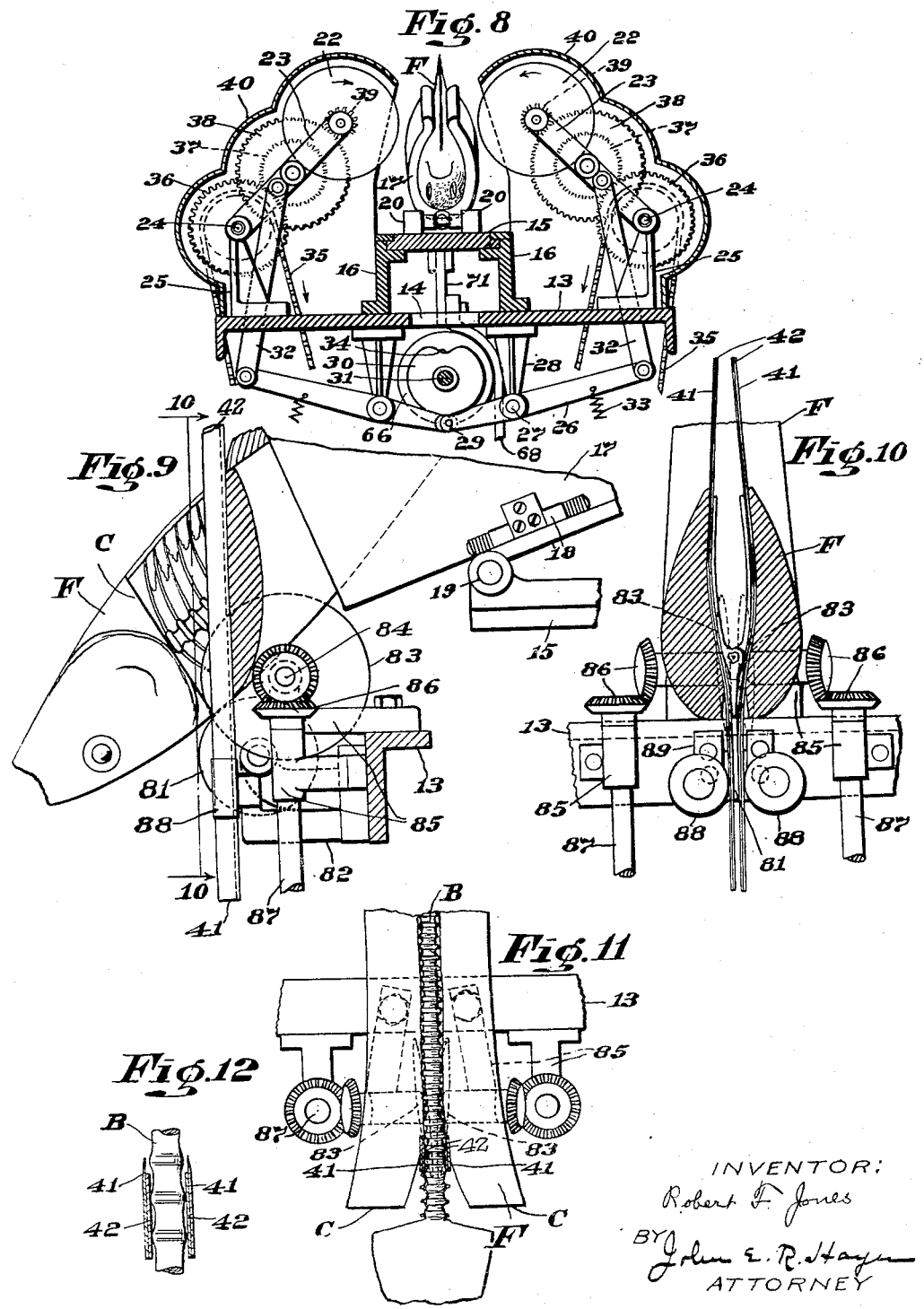

Patented July 28, 1936

2,048,701

UNITED STATES PATENT OFFICE 2,048,701

FISH CUTTING MACHINE

Robert F. Jones, Framingham, Mass.

Application November 5, 1934, Serial No. 751,468

25 Claims. (Cl. 17—3)

The invention relates to a machine for cutting fillets from fish.

Machines have been proposed heretofore having various forms of cutters for removing fillets from the opposite sides of a fish, but difficulty has been experienced heretofore in developing a machine that will rapidly cut the fillets close to the bone without cutting the backbone, or other skeleton structure.

The primary object of the present invention is to provide a machine that will quickly cut the fillets close to the bone while the knives are prevented from striking the backbone, or other skeleton structure.

An extremely important feature of the invention resides in guards associated with the knives and positioned between the knives and the backbone of the fish when the knives are in the fillet cutting position, so that the guards prevent the knives from striking the bony structure while they permit the knives to cut close to the bone and follow the contour of the bony structure. These guards by their engagement with the opposite sides of the bony structure serve to accurately center the fish between the knives, and they also exert a pull upon the backbone or other bony structure that serves to draw the fish forward between the knives. It will therefore be seen that these guards perform the important functions of feeding the fish forward between the knives, and of preventing the knives from striking the bony structure.

A more specific feature of the invention resides in flexible band knives for cutting the fillets from the fish close to the backbone, or other skeleton structure, and in flexible band guards arranged parallel to and between the knives in contacting relation therewith, so that the flexible knives and guards can bend part way around the ribs or other bony structure to cut close to the bone, while the guards prevent the knives from striking any part of the bony structure. The knives are preferably so driven that the portions thereof engaging the fish move in an upward direction while the adjacent portions of the flexible guards move downwardly. This improves the cutting action of the knives and causes the guards to pull the fish forward in an inclined direction that feeds the fish between the knives.

Other important features of the invention reside in mechanism for moving the fillet cutting knives towards each other into engagement with the fish just back of the head, and in a traveling carriage or support for moving the fish into a position to be engaged by the co-operative knives and guards so that the guards will pull the fish forward while the knives cut the fillets from the fish.

A further feature of the invention resides in knives adapted to slash the neck portion of the fish at its opposite sides to form cuts in the neck to receive the fillet cutting knives and guards, and in means for advancing the slashing knives and fillet cutting knives to the work in the proper timed relation.

Other features of the invention, and novel combination of parts in addition to the above, will be hereinafter described in connection with the accompanying drawings which illustrate one good, practical form thereof.

In the drawings:

Fig. 1 is an elevation of the machine of the present invention looking towards the discharge end thereof, the central discharge chute being omitted.

Fig. 2, on an enlarged scale, is a sectional view taken on the line 2—2 of Fig. 1.

Fig. 3 is a detaail view of a cam and arms operated thereby, the cam being turned to a different position from that in which it is shown in Fig. 1.

Fig. 4 is a side elevation of the machine disclosed in Fig. 1.

Fig. 5 is a vertical sectional view through the discharge end portion of the machine shown in Fig. 4.

Fig. 6 is an end view of a trough-shaped receptacle for receiving the fish.

Fig. 7 is a view of the back of the fish showing the cuts formed at each side of the dorsal fin by disk cutters preparatory to the entrance of the flexible band cutters.

Fig. 8 is a vertical sectional view taken on the line 8—8 of Fig. 4.

Fig. 9 is an enlarged vertical section of the machine of Fig. 1 taken at one side of the flexible band cutters.

Fig. 10 is a sectional view taken on the line 10—10 of Fig. 9.

Fig. 11 is a top plan view of inclined disks for slashing the back of the fish; and Fig. 12 is a transverse sectional view through the flexible band guards and cutters shown in their co-operative relation with the backbone of the fish.

The present machine, which will now be described, is so designed that the flexible band guards and cutters will bend around and follow the contour of the backbone and ribs of the fish. It is therefore extremely well adapted for cutting fillets from various types of fish with a minimum amount of waste.

The operating parts of the machine in the construction shown are supported by a frame formed of the legs or uprights 10 connected by the longitudinally extending beams 11 and transverse beams 12, and the frame thus provided has a table top 13 having a central longitudinal slot or opening 14. In elevated relation with the table top 13 is slidably mounted the carriage 15 which is supported over the slot 14 by rails 16 having the guideways best shown in Fig. 8 for slidably supporting the carriage 15. Upon the carriage 15 is pivotally mounted for tilting movement a trough shaped, fish-receiving support formed of the side plates 17. These plates are connected at their lower edges by the hinges 18 for swinging movement towards each other into embracing engagement with the fish F when the fish is placed in this trough-shaped support with its back down and stomach up as shown.

The hinges 18 are preferably provided with springs for urging the side plates 17 towards each other into engagement with the opposite sides of the fish, and these side plates are preferably given the concaved configuration in cross section best shown in Fig. 6 to conform to the curvature of the sides of the fish. The trough-shaped support 17 is pivotally mounted upon the carriage 15 for tilting movement by the transversely extending pin 19, the opposite ends of which are supported by brackets 20 extending upwardly from the carriage 15. The trough-shaped support 17 is normally supported in the slightly inclined position in which it is shown in Fig. 4 by the adjustable bolt or rest 21, the arrangement being such that the right hand end of this trough, viewing Fig. 4, will tilt upwardly as the flexible guides pull downwardly upon the fish in a manner to be described.

The fish F is placed in the trough 17 by hand with the back of the fish down so that the head protrudes from the left hand end of the trough as will be apparent in Fig. 4, and the fish should be carefully placed in the trough so that the head will protrude therefrom just far enough to cause the neck nicking knives, to be described, to form cuts c in the opposite sides of the neck of the fish just back of the fish's head, see Fig. 9 for the location of these cuts.

These nicking cuts, in the construction shown, are formed by circular knives 22 which are best shown in Fig. 8. These knives are journaled at the outer ends of the arms or levers 23 which are pivotally mounted at 24 upon the upstanding brackets 25 secured to the table top 13.

The knives 22 and their supporting arms 23 are normally held in the raised position in which they are shown in Fig. 8 by the rocking levers 26. These levers are pivotally mounted intermediate their ends at 27 to the brackets 28 that project downwardly from the table top 13. The inner end of each of these levers 26 is provided with a roller 29 which rests against the periphery of an operating cam 30 that is keyed or otherwise secured to a rotating shaft 31. The outer ends of the levers 26 are operatively connected by links 32 to the pivotally supported arms 23, and the outer ends of the levers 26 are continuously urged downwardly by the springs 33.

The operating cam 30 has the form of a circular disk throughout the greater portion of its periphery, but one portion of this circular disk or cam is provided with the depression 34. The arrangement is such that the cutters 22 will be held in the elevated position in which they are shown in Fig. 8 throughout the greater portion of a revolution of the operating shaft 31, but, when the depression 34 lies opposite the rollers 29, the outer ends of the levers 26 will move downwardly momentarily under the pull of the springs 33 so as to cause the nicking knives 22 to swing downwardly and form the cuts c in the opposite sides of the neck of the fish just back of its head.

The disk cutters are rotated in the construction shown by the driving chains 35 which travel in the direction indicated by the arrows in Fig. 8 and operate the train of driving gears 36, 37, 38 and 39 to turn these cutters in the direction indicated by the arrows in Fig. 8.

Should it be desired to vary the depth of the cuts c formed in the neck of the fish by the cutters 22 this may be accomplished by adjusting the brackets 25 slightly towards or from each other. The cutters 22 and operating mechanism therefor are preferably enclosed in the housing 40, and the cutters are so positioned that they will, when lowered, clear the forward end of the trough 17 when the trough is in its rearmost position. These cutters and operating mechanism, it should be noted, are supported by the table 13 at the opposite sides of the traveling carriage 15, and are spaced therefrom sufficiently so as not to interfere with the longitudinal movement of the carriage toward and from the flexible band cutters, to be described.

Adjacent the left hand end as shown in the machine of Fig. 4 are mounted to operate in substantially vertical planes the endless band cutters 41, and endless band guards 42. The flexible guards 42 lie between the cutters 41 so as to engage the fish's backbone B and hold the cutters out of engagement therewith, as best shown in Fig. 12.

Each flexible band 42 passes around a lower pulley 43 mounted upon an operating shaft 44, and around an upper pulley 45 journaled upon a shaft 46, and each of the pulleys 43 and 45 is provided with a flange 47 adapted to prevent the guards from running off of these pulleys. Each endless band knife 41 passes around a lower pulley 48 secured to an operating shaft 49, and an upper pulley 50 journaled upon a shaft 51, and these pulleys 48 and 50 are likewise provided with flanges for preventing the knives from running off the pulleys.

It is desirable to support the endless band knives and guards 41 and 42 for movement transversely of the machine towards and from the fish cutting position to thereby introduce these knives and guards in the nicks c formed at the opposite sides of the neck of the fish, and to this end, in the construction shown, the upper guard pulleys 45 and the upper knife pulleys 50 are supported by the swinging arms 52, which arms are pivotally supported by the shafts 53 carried by brackets secured to the table top 13. The arrangement is such that the arms 52 are continuously urged away from each other by the springs 54, but are periodically swung towards each other so as to move the upper portions of the flexible bands 41 and 42 into substantially parallel relation to each other, as indicated by the dot and dash lines in Fig. 1. The flexible knives and guards are preferably housed in a casing 55 which is partially broken away in Fig. 1 to show the right hand arm 52 in full lines, and in this connection it will be noted that the knives and guards, as shown in full lines, lie in front of the parts they appear to intersect.

It is important to prevent slack from occurring in the endless knife and guard bands as they are moved to and from the fish cutting position and this is accomplished in the construction shown, by supporting the pulley shaft 46 at one end of a transverse lever 56, which is journaled intermediate its ends at 57 to the upper end of the arm 52, and the opposite end of this lever 56 is continuously urged downwardly by a coiled spring 58, the lower end of which is anchored to a projection 59 extending laterally from the arm 52. The shaft 51 for the knife supporting pulley 50 is likewise yieldingly supported by a rocking lever 60 which is provided with a coiled spring 61 that continuously urges this lever in the band tightening direction.

Means is provided for periodically swinging the band knives and guards from their inactive position, in which they lie adjacent the side walls of the casing 45, toward each other to the dot and dash position of Fig. 1, and this is accomplished in the construction shown by rigidly securing to the arms 52, or to the pivotal shafts 53 of these arms, the downwardly extending operating arms 62, the lower ends of which are provided with the rollers 63 adapted to rest upon the periphery of the cam 64 which is rigidly secured to the operating shaft 31 above mentioned. The cam 64 may have the same configuration as the cam 30 and the arrangement is such that when the depression 65 of the cam 64 is in position to be engaged by the rollers 63 the arms 52 will be moved away from each other by the springs 54 to the position in which one is shown in full lines in Fig. 1, and when these rollers engage the rest of the periphery of the cam 64, which is of circular or cylindrical shape, the outer ends of the arms 62 will be forced apart, as shown in Fig. 3, to thereby retain the guards and knives close to each other in the fish cutting position.

As above stated, the cam 30 for periodically operating the neck nicking knives 22, and the cam 64 for periodically operating the fillet cutting knives 41, are mounted upon the operating shaft 31 so that these knives will go through their periodic movement each time the shaft 31 rotates through a complete turn. This shaft is also provided with the grooved drum 66 having a curved roller receiving slot 67 in its outer surface adapted to periodically operate the traveling carriage 15, and to this end, in the construction shown, an operating arm 68 is provided, the lower end of which is pivoted at 69 to its supporting bracket 70, and the upper end of this arm has pivotally secured thereto a link 71 which is also connected at 72 to the under side of the carriage 15. The arm 68, as will be apparent from Fig. 8, is bent laterally to cause it to curve part way around the arm operating drum 66, and is provided intermediate its ends with a roller which lies in the roller operating groove 67. The arrangement is such that as the shaft 31 is rotated the carriage 15 will be advanced by the operating mechanism just described to move the fish supporting mechanism from its rearmost position in which it is shown in Fig. 4, to a position in which the head of the fish will project between the band knives 41 far enough to bring the nicks c in the fish's neck opposite these knives.

Mechanism will now be described for driving the guard operating pulleys 43, knife operating pulleys 48 and cam supporting shaft 31. This is accomplished in the construction shown by providing the electric motor 73 which may be secured to the base of the machine and which drives a chain 74 adapted to rotate the right hand shaft 44, viewing Fig. 1. This shaft 44 is provided with a gear 75 which meshes with and drives a similar gear secured to the left hand shaft 44, viewing Fig. 1, so as to drive both of these shafts and their guard operating pulleys 43 at the same speed and in the directions indicated by the arrows. The right hand shaft 44, as viewed in Fig. 1, which may be regarded as the power shaft, is further provided with a driving gear 76 adapted to drive a gear 77 secured to the right hand shaft 49, viewing Fig. 1, to rotate this shaft. This shaft 49 is also provided with a gear 78 which meshes with and drives a similar gear 78 secured to the left hand shaft 49 of Fig. 1 so as to drive the knife operating pulleys 48 at the same speed and in the directions indicated by the arrows in Fig. 1. The cam shaft 31 in the construction shown is driven at a reduced speed from the shaft 49 by the chain 79. The gears 78 serve also to drive the lower sprockets 80 provided to drive the chains 35 which operate the cutters 22. The cam shaft 31 rotates at a relatively slow speed while the mechanism for driving the cutters 22 and 41 operates at a considerably higher speed.

It is important to notes that the endless band guards 42 are so operated that the runs thereof which engage the opposite sides of the fish's backbone move in a downward direction as will be apparent from the arrows shown in Fig. 1, whereas the adjacent runs of the band knives 41 move in an upward direction with the result that the band guards exert a downward and forward pull upon the backbone of the fish which serves to move the fish forward against the upwardly moving band cutters 41 as will be apparent from Fig. 9. This not only greatly improves the fillet cutting operation but serves, also, to feed the fish forward at just the proper speed.

As soon as the carriage has been moved forward by the operating mechanism described to present the fish F between the fillet cutting knives, these knives will be moved toward each other to introduce them and their guards 42 into the knife receiving nicks c formed in the fish's neck by the disk cutters 22. The downward movement of the guards 42 will exert a dragging action on the backbone B of the fish that serves to first tilt the fish supporting trough 17 to an increased inclination as will be apparent from Fig. 9, and then draw the fish forward out of this trough, and while the fish is being moved forward between the cutters 41 by the guards 42 the trough may be returned by its operating mechanism to the position in which it is shown in Fig. 4 to receive another fish and have its neck nicked by the cutters 22.

After the fish has been pulled from the trough 17 by the guards 42 it is supported, in the construction shown, from moving downwardly between the guards by a narrow roller 81 that extends between the guards 42 and is rotatably supported by the brackets 82. The rubbing action of the guards upon the ribs and backbone of the fish serves to retain the fish in the desired vertical plane during the fillet cutting operation and to accurately centre the fish by means of its backbone between the cutters 41.

While the guards and cutters, due to their movement in the direction of their length, will quickly cut their way into the nicks c towards the backbone, it is found that this action may be assisted, and a more efficient cutting of the fillets from the fish secured, by providing the inclined disk cutters 83 positioned adjacent the roller 81 and operable to gash the back of the fish at each side of the dorsal fin. These disks are secured to the inner ends of the operating shafts 84 which are supported by the brackets 85 at an inclination to each other as will be apparent from Figs. 10 and 11, and are positioned to extend inwardly between the guards 42. The disk cutters 83 are driven through bevel gears 86 from the upright shafts 87. The lower ends of these shafts are provided each with a worm 87¹. These worms are driven, respectively, by worm gears on the shafts 49.

The runs of the guards 42 and knives 41 are held close to each other just below the fish cutting position by the rollers 88 which are rotatably supported by brackets 89, which brackets are preferably vertically adjustable. These rollers cause the guards 42 to press against the ribs or backbone of the fish and to bend partly around the bony structure as will be apparent from Fig. 10, and also cause the knives 41 to bear against the guards and cut close to the bone, while the guards prevent the knives from engaging the bony structure. The flexible guards 42 are preferably wide enough to span two vertebrae of the backbone as this permits them to tilt readily to conform to the skeleton structure, while they will properly centre the fish even if the backbone is broken. The cutting edges of the knives 41 extend slightly beyond the blunt edges of the guards 42 as will be apparent from Fig. 12.

Having described the construction of the embodiment of the invention shown the operation of this machine is as follows:

The fish F are placed by hand, one at a time each with its back down and stomach up, in the V-shaped trough while the latter is in its rear position of Fig. 4, and care is taken to cause the head of the fish to project far enough out of the trough to cause the nicking knives 22 to form the nicks c just back of the bony structure of the head. While the fish lies in the trough 17 and the latter is in its rearward position of Fig. 4 the rotating disk knives are momentarily lowered by the depression 34 of the cam 30 to bring these knives into the dotted line position of Fig. 1 and nick the neck of the fish. The knives are then quickly returned to their raised position of Fig. 8.

The carriage 15 is then advanced by the cam drum 66 to bring the nicked portion of the fish between the fillet band cutters 41, whereupon the band knives are moved towards each other by the cam 64 which holds the lower arms 62 spread as shown in Fig. 3 and the upper arms 52 swung toward each other throughout the greater portion of the rotation of the cam shaft 31. This brings the band cutters and guards into the dot and dash position of Fig. 1 to engage them with the nicks c of the fish. From this time on the fish is pulled forward between the cutters 41 in the inclined position of Fig. 9 by the downward dragging action of the guards 42 upon the backbone, and as the fish continues to move between the knives and guards the fillets are cut therefrom and fall into the side discharge chutes 90, and the carcass of the fish drops upon the central discharge chute 91. While the fillets are being cut from one fish by the knives 41 the machine operator can place the next fish in the trough 17 so that it will be ready to present to the fillet cutting knives as soon as they finish their cutting operation upon the preceding fish.

It is found in practice that as the flexible guards and knives enter the nicks c the pressure of these flexible bands upon the bony structure at the rear of the fish's head tends to tilt the bands as shown in Fig. 7 to assist their movement inwardly towards the backbone. The slashes formed in the back of the fish by the inclined disk cutters 83 also facilitate the movement of the bands as shown in Fig. 7 to assist their movement these disks perform the further function of spreading the forward ends of the fillets outwardly as shown in Fig. 7.

Probably the most difficult part of the fillet cutting operation is to remove the meat from the fish close to the bone in the vicinity of the dorsal fin, that is the meat which lies in this vicinity between the back of the fish and its backbone. In the present machine the disk knives 83 not only remove this meat close to the bone, but serve also, due to their inclination, to direct this portion of the cut fillets outwardly out of the path of the band knives 41 so that this portion of the fillets will not be further cut by these knives.

In the drawings the fish being operated upon is shown as having been opened, but this is not necessary since the present machine will operate on fish which have not been opened, and due to the arrangement whereby flexible band knives move upwardly while the adjacent guards move downward the cutting action is such that soft delicate fish may have the fillets cut therefrom without unduly distorting the fish. The arrangement whereby the knives and guards travel in opposite directions has a further advantage in that it causes the machine to be self-cleaning of pieces of meat and other clogging particles. This cleaning action is also assisted by the adjacent disk cutters 83 and narrow roller 81 that works close to the inner faces of the bands 42.

The machine of the present invention is found in practice to work extremely well and is capable of cutting fillets from twenty fish or more per minute. It is also found that this machine will remove a greater percentage of the meat from the fish than experienced workmen will when they cut the fillets from the fish by hand.

I claim:

1. In a fish filleting machine, the combination comprising a knife for separating a fillet from a side of a fish, and a guard for the knife positioned to lie between the knife and bony structure of the fish to rest against the backbone or other skeleton structure and space the knife therefrom sufficiently to prevent the knife from engaging the bony structure of the fish during the fillet cutting operation.

2. In a fish filleting machine, the combination comprising a knife having a cutting edge, and a flexible guard for the knife constructed to lie between the knife and the bony structure of the fish and to bend partly around said structure and adapted to rest against the backbone or other skeleton structure and hold the knife out of engagement with the bony structure during the fillet cutting operation.

3. In a fish filleting machine, the combination comprising a knife for cutting a fillet from a side of a fish, and a guard for the knife positioned alongside the knife to rest against the bony structure of the fish exterior said bony structure during the fillet cutting operation and hold the knife out of engagement with the bony structure and having a blunt edge positioned so that the cutting edge of the knife lies forward of said blunt edge.

4. In a fish filleting machine, the combination comprising a knife for separating a fillet from a side of a fish, and a guard supported alongside said knife at the rear of its cutting edge and adapted to rest against the bony structure of the fish exterior said bony structure during the fillet cutting operation and slide thereover to hold the knife out of engagement with the bony structure.

5. In a fish filleting machine, the combination comprising a pair of flexible band knives, a pair of flexible band guards positioned between said knives in parallel relation thereto and adapted to bear flat against said knives and slide over the bony structure of the fish during the fillet cutting operation to hold the knives out of contact with the bony structure, and means for driving the knives and guards.

6. In a fish filleting machine, the combination comprising a pair of knives for cutting fillets from the opposite sides of the fish, and a pair of knife guards located between said knives and adapted to rest against the opposite sides of the skeleton structure of the fish exterior said skeleton structure during the fillet cutting operation and to centre the fish relative to the knives.

7. In a fish filleting machine, the combination comprising a pair of knives for cutting fillets from the opposite sides of the fish, guards for the knives positioned to rest against the opposite sides of the backbone or skeleton structure of the fish and prevent the knives from engagement therewith, and means for operating said guards to cause them to exert a pulling action upon the backbone to pull the fish between the knives.

8. In a fish filleting machine, the combination comprising a pair of flexible band knives for cutting fillets from the opposite sides of a fish, a pair of flexible band guards adjacent said knives and adapted to rest against the backbone or other skeleton structure of the fish during the cutting operation and hold the knives out of engagement with the bony structure, and means for driving the knife bands and guard bands.

9. In a fish filleting machine, the combination comprising a knife for separating a fillet from a side of a fish, a guard for the knife positioned to lie between said knife and the bony structure of the fish during the cutting operation, and means for moving the knife and guard in opposite directions.

10. In a fish filleting machine, the combination comprising knives for separating fillets from the opposite sides of a fish, guards for the knives positioned to rest against the opposite sides of the backbone of the fish and prevent the knives from engaging the backbone, and means for driving the knives in one direction and the guards in the opposite direction whereby the guards tend to pull the meat of the fish against the knives.

11. In a fish filleting machine, the combination with a support over which the fish is drawn during the fillet cutting operation, of a set of knife guards arranged adjacent said support for movement past said support, said guards being adapted and arranged to engage the skeleton structure of the fish during the cutting operation and draw the fish forward over said support to advance the fish relative to the guards and expel it from said guards, and knives adjacent said guards for cutting fillets from the fish as it is moved forward by the guards.

12. In a fish filleting machine, the combination with a support over which the fish is drawn during the fillet cutting operation, endless band guards adjacent said support and positioned to engage the skeleton structure of the fish during the cutting operation and draw it forward over the support and advance the fish skeleton between said guards, knives adjacent said guards for cutting fillets from the fish as the fish is moved forward by the guards, and means for driving the band guards.

13. In a fish filleting machine, the combination comprising a knife having a cutting edge adapted to cut a fillet from a side of a fish, a guard for the knife having a relatively blunt edge, said knife lapping the guard whereby the cutting edge of the knife will lie forward of the blunt edge of the guard during the cutting operation, and means for moving the knife and guard in opposite directions during said operation.

14. In a fish filleting machine, the combination comprising an endless knife having a cutting edge, an endless guard for the knife adapted to engage the skeleton structure of the fish to space the knife therefrom and having a relatively blunt edge, said knife and guard co-operating with one another in a manner whereby the cutting edge of the knife will lie forward of the blunt edge of the guard during the cutting operation, and means for moving the knife and guard longitudinally in opposite directions during said operation.

15. In a fish filleting machine, the combination with a bearing over which the fish is drawn, of a set of endless knife guards arranged forward of said bearing and movable downwardly past said bearing, said guards being adapted and arranged to engage the skeleton structure of the fish during the cutting operation and draw the fish over said bearing and move the fish forward to be expelled from said guards, endless knives co-operating with said guards to cut the fish as the fish is moved by the operation of the guards, and means for moving the knife and guard longitudinally in opposite directions during said operation.

16. In a fish filleting machine, the combination comprising a pair of flexible band knives for cutting fillets from the opposite sides of a fish, means for supporting said knives for swinging movement towards each other transversely of the fish to engage the knives with the fish back of its head, means for moving the knives towards and from each other, means for driving said knives, and means for advancing the fish relative to the knives to cut the fillets entirely from the fish.

17. In a fish filleting machine, the combination comprising a pair of knives for cutting fillets from the opposite sides of a fish, guards for the knives positioned to rest against the opposite sides of the backbone or skeleton structure, means for operating said guards to cause them to act upon the backbone to pull the fish forward in a downward direction between said knives, and a tiltingly mounted support for the fish adapted to support the fish in position to be engaged by the guards and knives and to be tilted upon its pivotal mounting by the down pull of the guards upon the fish.

18. In a fish filleting machine, the combination comprising a pair of knives for cutting fillets from the opposite sides of a fish, flexible band guards positioned between said knives to hold the knives out of engagement with the bony structure of the fish, a disk roller extending between said guards to support the fish as it is drawn forward by the guards between the knives, and means for driving the guards to cause them to pull the fish forward over the roller by their engagement with the bony structure of the fish.

19. In a fish filleting machine, the combination comprising a pair of band knives for cutting fillets from a fish and supported for movement laterally of the fish to and from the cutting position, a second pair of knives for nicking the neck of the fish at opposite sides thereof to form openings for said band knives, a cam and means operable thereby for periodically moving the band knives to and from their cutting position, a second cam and means operable thereby to move said nicking knives to and from their cutting position, and means for driving said cams and knives.

20. In a fish filleting machine, the combination comprising a pair of knives for cutting fillets from the opposite sides of a fish, a pair of guards positioned between said knives for holding the knives out of contact with the bony structure of the fish, a disk roller between said guards upon which the fish rests during the cutting operation, and a pair of disk knives arranged in straddling relation to said roller and adapted to slit the back of the fish as the fish passes over said roller.

21. In a fish filleting machine, the combination comprising a traveling support adapted to hold a fish on its back with its stomach up, knives for nicking the fish at the opposite sides of its neck while the fish is on said support, a pair of band knives supported for movement towards and from each other, means for advancing said support to position the nicked portion of the fish between said knives, and means for moving the band knives toward each other into said nicks.

22. In a fish filleting machine, the combination comprising a trough-shaped support adapted to hold a fish therein on its back, endless band knives for cutting fillets from the opposite sides of the fish, means for advancing the knives toward each other transversely of the fish while the fish is supported in the trough-shaped support to engage the knives with the fish back of its head, and means for advancing the fish between the fillet cutting knives.

23. In a fish filleting machine, the combination comprising a trough-like support for receiving the fish whereby it will lie in a substantially vertical plane with the back of the fish down and the stomach up, means for nicking the opposite sides of the fish adjacent its head when the fish is lying within said support, a bearing lying forward of said support toward which said support is movable and over which the fish passes from out of said support, a set of knives arranged adjacent said support for incising the back of the fish as the fish passes over said bearing from out of said support, a set of endless knife guards arranged forward of said bearing with running portions thereof spaced from one another to lie in planes substantially parallel with that of the fish and between which portions said fish is passed to be drawn by said guards over said bearing and knives to be expelled from said guards, filleting knives co-operating with said guards to cut fillets from the fish as the fish is moved by the operation of the guards, and means for operating the filleting knives and guards.

24. In a fish filleting machine, the combination comprising a trough-like support for receiving the fish whereby it will lie in a substantially vertical plane with the back of the fish down and the stomach up, means for nicking the opposite sides of the fish adjacent its head when the fish is lying within said support, a bearing lying forward of said support toward which said support is movable and over which the fish passes from out of said support, a set of knives arranged adjacent said support for incising the back of the fish as the fish passes over said bearing from out of said support, a set of endless knife guards arranged forward of said bearing with running portions thereof extending downwardly by said bearing, said running portions of the guard being spaced from one another to lie in planes substantially parallel with that of the fish and between which portions the fish is passed to be drawn by said guards over said bearing and knives to be expelled from said guards, a set of endless filleting knives having running portions passing upwardly by said bearing and co-operating with said guards in manner whereby the cutting edges of the filleting knives will lie beyond the edges of the guards during the cutting operation, and means for moving the filleting knives and guards in opposite directions during said operation.

25. In a fish filleting machine, the combination comprising a trough-like support for receiving the fish whereby it will lie in a substantially vertical plane with the back of the fish down and the stomach up, means for nicking the opposite sides of the fish adjacent its head when the fish is lying within said support, means for moving said support forward and back, a bearing lying forward of said support toward which said support is movable and over which the fish passes from out of said support, a set of knives arranged adjacent said support for incising the back of the fish as the fish passes over said bearing from out of said support, a set of endless knife guards arranged forward of said bearing with running portions thereof extending downwardly by said bearing, said running portions of the guard being spaced from one another to lie in planes substantially parallel with that of the fish and between which portions the fish is passed to be drawn by said guards over said bearing and knives to be expelled from said guards, a set of endless filleting knives having running portions passing upwardly by said bearing and co-operating with said guards in manner whereby the cutting edges of the filleting knives will lie beyond the edges of the guards during the cutting operation, and means for moving the filleting knives and guards in opposite directions during said operation.

ROBERT F. JONES.